Patented Aug. 22, 1939

2,170,781

UNITED STATES PATENT OFFICE 2,170,781

2,4-DIOXO-3,3-DIALKYL-TETRAHYDRO-PYRIDINE-6-CARBOXYLIC ACIDS AND PROCESS FOR THEIR MANUFACTURE

Otto Schnider, Basel, Switzerland, assignor to Hoffmann-La Roche Inc., Nutley, N. J., a corporation of New Jersey No Drawing. Application May 27, 1938, Serial No. 210,516. In Germany August 25, 1937

7 Claims. (Cl. 260—295)

In accordance with the process of U. S. Patent 2,090,068 the amino-methylene-dialkyl-aceto-acetic esters, obtained by condensation of dialkyl-aceto-acetic esters with formic esters and subsequent treatment with ammonia, can easily be converted into pyridine derivatives by alkaline condensing agents.

It has now been found that 2,4-dioxo-3,3-dialkyl-tetrahydro-pyridine-6-carboxylic acids can be obtained by causing alkali alcoholates to act on 2,2-dialkyl-3-hydroxy-5-amino-hexene-(4)-dicarboxylic-acid-(1,6)-dialkyl esters, formed by the reaction of 2,2-dialkyl-3,5-dioxo-hexane-dicarboxylic-acid-(1,6)-dialkyl esters with ammonia, and saponifying the esters initially formed.

The starting materials, i. e., 2,2-dialkyl-3,5-dioxo-hexane-dicarboxylic-acid-(1,6)-dialkyl esters, obtained by the action of oxalic ester on dialkyl-aceto-acetic ester, are as yet unknown. They are colourless oils of rather high boiling point which distil undecomposed in vacuo. By treatment with ammonia, both ester groups remain unchanged and the ammonium salts of the enol form of the dioxo-esters are first formed which, at least in the form of their salts, must be described as 2,2-dialkyl-3-oxo-hexene-(4)-ol-(5)-dicarboxylic-acid-(1,6)-dialkyl esters. These ammonium salts are converted by gentle warming into 2,2-dialkyl-3-oxo-5-amino-hexene-(4)-dicarboxylic-acid-(1,6)-di-esters with elimination of water. The amino-hexene acid esters are also high-boiling oils distilling unchanged in vacuo. By the action of alkali alkoxides they yield 2,4-dioxo-3,3-dialkyl-tetrahydro-pyridine-6-carboxylic acid esters in a smooth reaction. The reactions mentioned before can be illustrated as follows, whereby R=alkyl, R' and R''=alkyls, which can be similar or different.

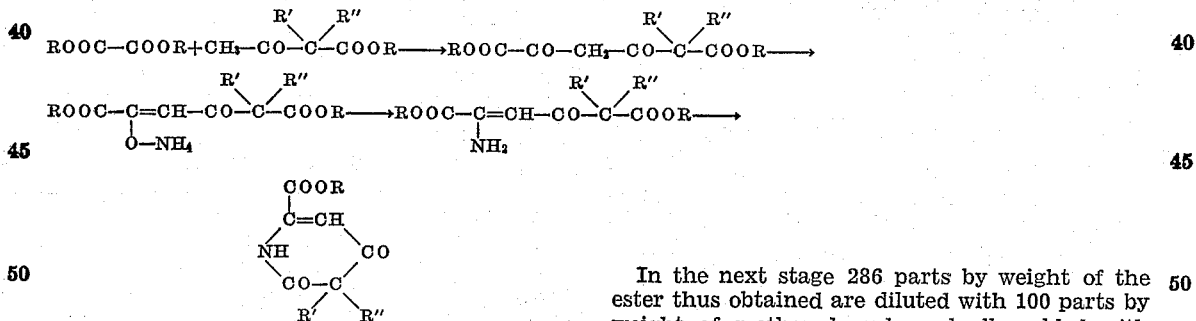

The new 2,4-dioxo-3,3-dialkyl-tetrahydro-pyridine-6-carboxylic acid esters are low-melting, distillable compounds which are easily saponified by alkalis. The corresponding free acids crystallise well and form neutral alkali salts easily soluble in water. They are intermediate products for the manufacture of medicinal preparations. Thus by decarboxylation of the free acids, the soporifics of the pyridine series described in U. S. Patent specification 2,090,068 are obtained.

Example 1

24 parts by weight of pulverised sodium are prepared by vigorous stirring in 450 parts by weight of dry toluene. About one tenth, i. e., 35 parts by weight, of a mixture of 186 parts by weight of diethyl-aceto-acetic ester and 146 parts by weight of oxalic acid diethyl ester are added and the whole heated with continuous stirring. The reaction begins between 50 and 60° C. External heating is immediately interrupted and the temperature always kept at about the same point by cooling slightly. When the main reaction has subsided, the remaining nine tenths of the mixture are added dropwise in such a manner that the temperature always remains between 50 and 55° C. without external application of heat. When all has been added, that is after about an hour, the product is stirred at 50° C. for another 30 minutes. The sodium has now completely disappeared. The solution is brown-yellow and clear. It is cooled while stirring, and then 100 parts by weight of ice and 340 parts by volume of 3 n-sulphuric acid added. After stirring for about ½ hour, the whole has become nearly colourless. The toluene layer now contains the free 2,2-diethyl 3,5-dioxo-hexane-dicarboxylic-acid-(1,6)-diethyl ester. The latter is purified by distillation after removal of the toluene. It boils at 175–176° C. under a pressure of 14 mm.

In the next stage 286 parts by weight of the ester thus obtained are diluted with 100 parts by weight of methanol and gradually added with stirring to 200 parts by weight of 15 per cent. methyl-alcoholic ammonia, well cooled with ice, at such a rate that the temperature never exceeds 20° C. The resulting ammonium salt of 2,2-diethyl- 3,5 -dioxo-hexane-dicarboxylic-acid-(1,6)-diethyl ester is freed from methanol and excess ammonia under reduced pressure at about 40° C. and the solid ammonium salt gradually heated under reduced pressure to 100° C. in a water-bath, whereby the ammonium salt is converted by elimination of water into 2,2-diethyl-3-oxo-5-amino-hexene-(4)-dicarboxylic-acid-(1,6)-diethyl ester. The dehydration is complete after about an hour. The residual mobile oil is distilled in vacuo. The 2,2-diethyl-3-oxo-5-amino-hexene-(4)-dicarboxylic-acid-(1,6)-diethyl ester boils at 181–183° C. under a pressure of 14 mm.

To effect ring closure 285 parts by weight of this ester are boiled for ½ hour under reflux with a solution of sodium methoxide prepared from 200 parts by weight of methanol and 23 parts by weight of sodium. The cooled solution is made slightly acid to Congo paper with about 90 parts by weight of concentrated hydrochloric acid. The methanol is now driven off. The remaining crystalline mass is taken up in ether and the ether solution washed with water. After evaporation of the ether and recrystallisation of the residue from dibutyl ether, the 2,4-dioxo-3,3-diethyl-tetrahydropyridine-6-carboxylic acid methyl-ester melting at 80–81° C. is obtained in slightly yellow crystals by ring-closure and simultaneous interchange of ester radicals.

If this ester is dissolved in the fourfold quantity of a 3-n solution of caustic soda it soon gets warm and is saponified. After 20–30 minutes the solution is again acidified. Thereby the 2,4-dioxo-3,3-diethyl-tetrahydro-pyridine-6-carboxylic acid precipitates in compact crystals which are recrystallised from hot water. The acid crystallises with one molecule of water of crystallisation and melts at 145–146° C. when anhydrous.

Example 2

A mixture of 210 parts by weight of diallyl-aceto-acetic ester and 146 parts by weight of oxalic acid diethyl-ester is added to 24 parts by weight of powdered sodium stirred vigorously in 450 parts by weight of dry toluene in the same manner as described in Example 1. The reaction starts at about 50° C. and has to be moderated by cooling. The 2,2-diallyl-3,5-dioxo-hexane-dicarboxylic-acid-(1,6)-diethyl ester boils at 196–197° C. under a pressure of 14 mm.

The 2,2-diallyl-3-oxo-5-amino-hexene-(4)-dicarboxylic-acid-(1,6)-diethyl ester obtained by the action of ammonia under the conditions described in Example 1 has a boiling point of 206–207° C. under a pressure of 14 mm.

23 parts by weight of sodium are dissolved in 260 parts by weight of absolute ethanol, the solution treated with 309 parts by weight of the above ester and boiled for ½ hour under reflux. The cooled solution is rapidly made slightly acid to Congo paper with about 90 parts by weight of concentrated hydrochloric acid and the ethanol evaporated in vacuo. The remaining oil is taken up in ether and the ether solution washed with bicarbonate solution and water. The oil remaining after evaporation of the ether is distilled under reduced pressure. The 2,4-dioxo-3,3-diallyl-tetrahydro-pyridine-6-carboxylic acid ethyl-ester boils at 202–203° C. at a pressure of 14 mm. It forms a yellowish oil.

If it is dissolved in the fourfold quantity of a 3-n-solution of caustic soda and the solution again acidified after 30 minutes, 2,4-dioxo-3,3-diallyl-tetrahydro-pyridine-6-carboxylic acid precipitates as an oil which soon solidifies. The crystalline mass is sucked off and recrystallised from methanol. The acid melts at 148–150° C.

Example 3

In the same manner 2,2-di-n-propyl-3,5-dioxo-hexane-dicarboxylic-acid - (1,6) - diethyl ester melting at 195–197° C. at a pressure of 14 mm. and 2,2-di-n-propyl-3-oxo-5-amino-hexene-(4)-dicarboxylic-acid-(1,6)-diethyl ester melting at 202–204° C. at a pressure of 14 mm. are prepared from di-n-propyl-aceto-acetic ester.

313 parts by weight of this ester are boiled for 30 minutes under reflux with 290 parts by weight of sodium-ethoxide solution containing 23 parts by weight of sodium. The brown solution is cooled and acidified with about 90 parts by weight of concentrated hydrochloric acid, whereby the product becomes considerably lighter until it is only slightly yellow. The 2,4-dioxo-3,3-di-n-propyl-tetra-hydro-pyridine - 6 - carboxylic acid ethyl-ester freed from ethyl alcohol is taken up in ether, the ether solution washed with 5 per cent. sodium-carbonate solution and the residue remaining after removal of the ether distilled under reduced pressure. It boils at 205–206° C. at a pressure of 14 mm. and melts at 64–65° C. It is very easily soluble in organic solvents and can be recrystallised from an equal quantity of high-boiling petroleum ether.

The 2,4-dioxo-3,3-di-n-propyl-tetrahydro-pyridine-6-carboxylic acid obtainable therefrom crystallises from dilute alcohol with water of crystallisation and melts at 110–111° C.

The free acid can also be directly obtained without previous isolation of the ester, if the alcoholic solution of the sodium salt of the ester obtained in the reaction with sodium ethoxide is treated with about the same quantity of water and the product made slightly acid to Congo paper after distilling off the alcohol.

Example 4

2,2-methyl-n-propyl-aceto-acetic ester is converted into 2,2-methyl-n-propyl-3,5-dioxo-hexane-dicarboxylic-acid-(1,6)-diethyl ester (boiling at 182–184° C. at a pressure of 14 mm) with oxalic ester according to the method described in Example 1 and the 2,2-methyl-n-propyl-3-oxo-5-amino - hexene-(4)-dicarboxylic - acid-(1,6)-diethyl ester boiling at 200–202° C. at a pressure of 14 mm obtained therefrom by the action of ammonia as described. If 285 parts by weight of 2,2-methyl-n-propyl-3-oxo-5-amino-hexene (4)-dicarboxylic-acid-(1,6)-diethyl ester are added to an alcoholic solution of sodium ethoxide, prepared from 23 parts by weight of sodium and 260 parts by weight of absolute alcohol, and boiled for ½ hour under reflux, 2,4-dioxo-3,3-methyl-n-propyl-tetrahydro - pyridine-6-carboxylic acid ethyl-ester is formed. In order to separate it, the product is acidified with concentrated hydrochloric acid until slightly acid to Congo paper and the alcohol removed by evaporation under reduced pressure. If the residue is now extracted with ether and the ethereal solution washed with a solution of sodium bicarbonate and water, the compound can be distilled in vacuo after evaporation of the ether without decomposition (boiling point 197–198° C. at a pressure of 14 mm). The distillate solidifies and is recrystallised from double the quantity by weight of petroleum ether B. P. 80–105° C. The 2,4-dioxo-3,3-methyl-n-propyl-tetrahydro-pyridine- 6-carboxylic acid ethyl-ester forms slightly yellowish crystals melting at 84–85° C.

By saponifying in the usual manner the free 2,4-dioxo-3,3-methyl-n-propyl-tetrahydro-pyridine-6-carboxylic acid melting at 144–145° C. is obtained.

I claim:

1. The 2,4-dioxo-3,3-dialkyl-tetrahydro-pyridine-6-carboxylic acids of the type formula

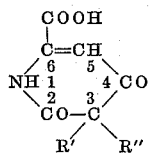

in which R' and R'' are alkyl groups.

2. The 2,4-dioxo-3,3-diethyl-tetrahydro-pyridine-6-carboxylic acid.

3. The 2,4-dioxo-3,3-dialkyl-tetrahydro-pyridine-6-carboxylic acid esters.

4. The 2,4-dioxo-3,3-diethyl-tetrahydro-pyridine-6-carboxylic acid methyl-ester.

5. A process for the manufacture of a 2,4-dioxo-3,3-dialkyl-tetrahydro-pyridine-6-carboxylic acid ester which comprises the steps of condensing oxalic ester with a dialkyl aceto acetic ester, treating the condensation product with ammonia, moderately heating the reaction product under conditions bringing about the elimination of water to obtain 2,2-dialkyl-3-oxo-5-amino-hexene-(4)-dicarboxylic acid-(1,6)-di-ester and treating this product with a condensing agent selected from the group consisting of alkali hydroxides and ethoxides.

6. A process for the manufacture of a 2,4-dioxo-3,3-dialkyl-tetrahydro-pyridine-6-carboxylic acid ester which comprises the steps of condensing oxalic ester with a dialkyl aceto acetic ester, treating the condensation product with ammonia, moderately heating the reaction product under conditions bringing about the elimination of water to obtain 2,2-dialkyl-3-oxo-5-amino-hexene-(4)-dicarboxylic acid-(1,6)-di-ester and treating this product with an alkali alcoholate in alcoholic solution.

7. A process for the manufacture of 2,4-dioxo-3,3-dialkyl-tetrahydro-pyridine-6-carboxylic acid ethyl ester which comprises the steps of condensing diethyl oxalate with diethyl aceto acetic ester, treating the condensation product with ammonia, moderately heating the reaction product under conditions bringing about the elimination of water to obtain 2,2-diethyl-3-oxo-5-amino-hexene-(4)-dicarboxylic acid diethyl ester and treating this product with sodium ethylate in alcoholic solution.

OTTO SCHNIDER.